April 7, 1942.  W. A. WRIGHT  2,278,756
METHOD OF FORMING TUBE OR GASKET ANGLES
Filed May 27, 1940

INVENTOR
William A. Wright
BY Evans + McCoy
ATTORNEYS

Patented Apr. 7, 1942

2,278,756

UNITED STATES PATENT OFFICE 2,278,756

METHOD OF FORMING TUBE OR GASKET ANGLES

William A. Wright, Wabash, Ind., assignor to The General Tire & Rubber Company, Akron, Ohio, a corporation of Ohio Application May 27, 1940, Serial No. 337,328

2 Claims. (Cl. 154—42)

This invention relates to a method and apparatus for preparing tube or gasket angles. It particularly relates to a method for forming the corners of extruded tubular cavity gaskets for refrigerator doors and the like without impairing the resiliency and sealing effects at the corner.

Refrigerator door sealing gaskets are usually extruded in long lengths and the corners are formed by notching an edge of the material and bending. Such a procedure obviously affects the operation, appearance, and the thickness of the gasket at the corner.

The modern gaskets usually have at least one longitudinal tubular chamber and a fastening flange for attaching the gasket to the door of the refrigerator. The tubular chamber is often shaped in the form of a crescent to give the tube the resilience and sealing effect of two superimposed chambers. While it has been proposed to miter ends of the tubes and join the corners with a rubber cement, the strength of the bond has either been unsatisfactory or the resiliency and strength of the corner has been greatly decreased by the process or apparatus used.

It is an object of this invention to provide a method for preparing angles and corners of tubular rubber articles, such as refrigerator gaskets, wherein the strength and resiliency of the corner is not impaired.

Another object of this invention is to provide a method for preparing sealing gasket angles having improved appearance and having the same resistance to deformation as other portions of the gasket.

A further object of this invention is to provide apparatus for molding angles in gaskets having a longitudinal tubular chamber, which apparatus does not destroy the desired characteristics of the molded joint when it is properly removed.

Other objects will be apparent from the following description of the invention as illustrated by the drawing, in which.

Figure 1:
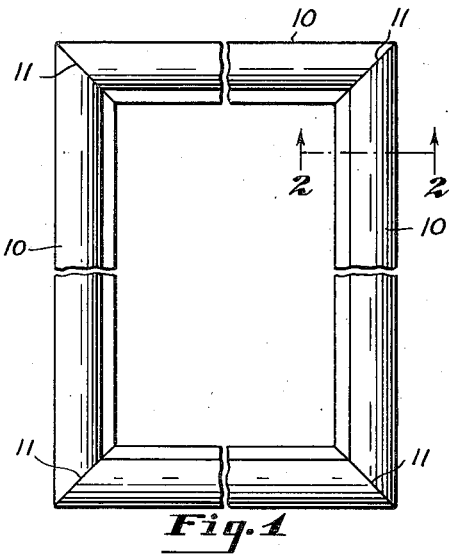
Figure 1 is an elevational view of a suitable door gasket with portions removed and having corners or angles formed by the method of this invention.

Referring more particularly to the drawing wherein like parts are designated by like numerals of reference, extruded tubular gaskets with which this invention is chiefly concerned have a longitudinal tubular chamber or cavity 2 which may be crescent shaped with an outer wall 3 and an inner or bottom wall 4, which is invisible from the outside of the gasket. Both of the walls of the cavity are curved in the same general direction, but wall 3 has a smaller radius of curvature than wall 4. The base member 5 is joined to only one side 6 of the crescent shaped tube, and extends under and beyond the side edge 7, forming the cavity 8 and the fastening flange 9.

Figure 2:
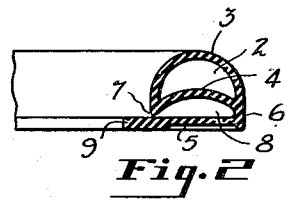
Fig. 2 is a sectional view of a suitable tubular gasket angle on the line 2—2 of Fig. 1.
Figure 4:
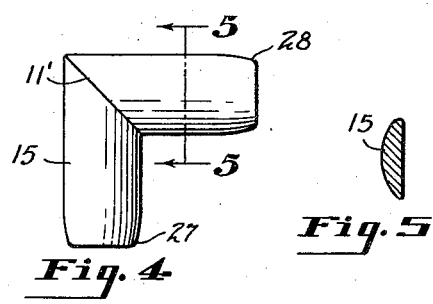
Fig. 4 is a plan view of one of the core members for use in the mold of Fig. 3.
Figure 5:
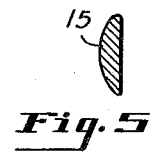
Fig. 5 is a section on the line 5—5 of Fig. 4.
Figure 3:
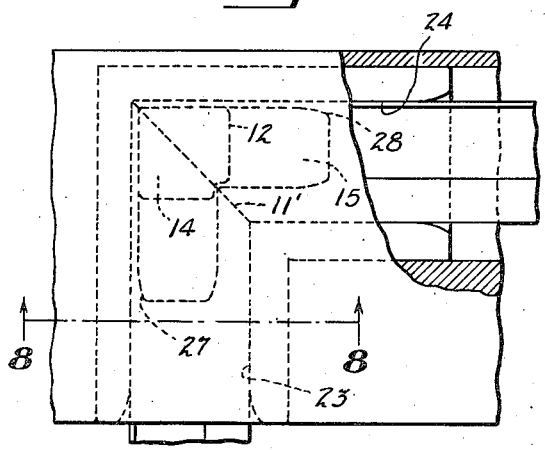
Fig. 3 is a plan view of a mold embodying this invention with a portion broken away to show the gasket therein.
Figure 6:
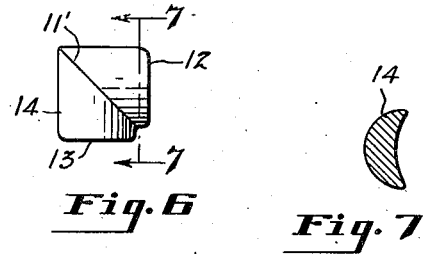
Fig. 6 is a plan view of another core member for use in the mold of Fig. 3, which core member is adapted to cooperate with the core member of Fig. 4.
Figure 7:
Fig. 7 is a sectional view on the line 7—7 of Fig. 6.
Figure 9:
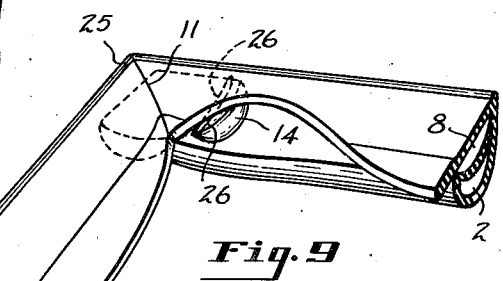
Fig. 9 is a perspective view showing the manner of extracting the core from the tubular chamber according to the invention.
Figure 8:
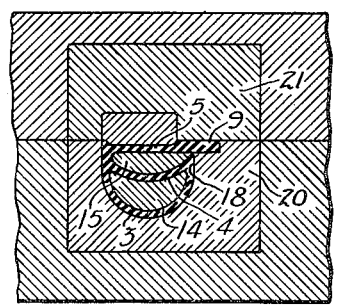
Fig. 8 is a sectional view through the mold on the line 8—8 of Fig. 3, showing the cores and gasket in the mold.

In the preparation of tubular gasket angles such as door gaskets and corners according to the method of this invention, strips 10 of suitable length having the desired cross sectional shape and size, such as is illustrated by Fig. 2, are mitered or cut at a suitable angle, which is about ½ of the angle desired between the joined gasket lengths, as indicated in Fig. 1 by the line of contact between the mitered ends 11. A mitered end 11 of each length 10 and the immediate vicinity thereof are coated with a heavy layer of curable rubber cement. One of the legs 12 or 13 of the angle shaped core 14, which has a cross section corresponding in size and shape to that of the tubular cavity 2, is then inserted in the tubular cavity 2 of each of the strips 10 near the mitered ends.

The mitered ends 11 are then brought together so as to totally enclose the core 14 in the tubular cavity 2 and form the desired angle between the lengths. The core 15 with legs 27 and 28, having a shape corresponding to that of the other cavity 8, may either be inserted in the cavity 8 before or after the mitered ends 11 are brought into contact. The angle formed by the two contacting mitered edges, which angle has the cores 14 and 15 suitably placed within the cavities 2 and 8, is then placed in the cavity 18 of the mold 19, which has separable sections 20 and 21, where the cement joining the ends 11 is completely cured, forming a strong homogeneous joint.

The branches 23 and 24 of the cavity 19 of the mold 19 run at an angle to each other, and the cross section of each branch corresponds in shape and size to the outer dimensions of the gasket. The outer surfaces of the two legs of each of the core members, and the inner surfaces of the two branches of the mold are in register, and, therefore, the surfaces of each pair intersect to form curves 11' which lie in single planes. The angles between the planes of intersection and either of the two legs of the respective mold or core members are in any given case substantially the same and correspond to ½ the gasket angle.

Because of the coaction of the core members 14 and 15 with the mold portions 20 and 21, the mitered or tapered edges 11 are held in register and under pressure during the curing operation, and a strongly bonded corner or angle having the appearance of a unitary casting is produced.

After the angle 25 has been removed from the mold, the base member 5 may be raised from contact with the edge 7 and the core member 15 may be readily removed from the cavity 8. A suitable slit 26 for removing the core 14 is then cut in the base member 5 at an angle and preferably substantially perpendicular to the center line or edges of the tubular cavity 2. An end 12 or 13 of the core member 14, which end is preferably tapered as shown, is then inserted through the slit 26 and the core member is readily withdrawn. It has been found that when the slit 26 is cut substantially perpendicular to the edges 6 and 7, the resistance of the corner portion of the gasket to deformation remains substantially equal to that of other portions; whereas, when the slit is cut parallel to the edges, the resistance to deformation is decreased to such an extent that the appearance of the strip is affected.

It will be seen that by providing a molded and cured or vulcanized joint between the tubular gaskets, that a corner having the characteristics of an entirely molded corner may be produced at relatively low cost. Although the slit 26 remains in the lower wall 4 of the tubular cavity, it does not affect the function of the gasket.

It is to be understood that variations and modifications of the specific device herein shown and described for purposes of illustration, may be made without departing from the spirit of the invention.

What I claim is:

1. A method of forming an angle or corner of a resilient tubular cavity gasket for refrigerator doors and the like without appreciably impairing the resiliency of the gasket at the corner, comprising preparing a mitered end of suitable angle on each of two strips of gasket material having a closed longitudinal tubular cavity therein, which cavity has an outer wall and an inner wall, which inner wall is normally invisible from the exterior of the gasket, coating the mitered edges with a suitable rubber cement, bringing the coated edges of the two strips together and in register while simultaneously enclosing a core within the tubular cavity adjacent said edges, curing the coating on the edges while holding the coated edges in a mold and in register, forming a cut through said inner wall of said cavity adjacent said core and removing said core through said cut without affecting the continuity of the outer wall of said tubular gasket.

2. A method of forming an angle or corner of a resilient tubular cavity gasket for refrigerator doors and the like without appreciably impairing the resiliency of the gasket at the corner, comprising preparing a mitered end of suitable angle on each of two strips of gasket material having a closed longitudinal tubular cavity therein, which cavity has a crescent-shaped outer wall and a crescent-shaped inner wall which is normally invisible from the exterior of the gasket when suitably mounted, coating the mitered edges with a suitable rubber cement, bringing the coated edges of the two strips together and in register while simultaneously enclosing a core in said tubular cavity, curing the coating on the edges while holding the coated edges in a mold and in register, forming a slit through only said inner wall of the closed cavity in one of said strips and removing said core through said slit without affecting the continuity of the outer wall of said tubular gasket, said slit running at about right angle to the longitudinal axis of the closed cavity in its strip.

WILLIAM A. WRIGHT.